United States Patent [19]

Suzuki et al.

[11] Patent Number: 4,663,940

[45] Date of Patent: May 12, 1987

[54] ELECTRICAL AUXILIARY EQUIPMENT FOR VEHICLES WITH TROUBLE POINT SELF-DIAGNOSTIC FUNCTION

[75] Inventors: Yoshitaka Suzuki, Saitama; Hiroshi Komatsu; Hayahiro Kobayashi, both of Tokyo, all of Japan

[73] Assignee: Honda Giken Kogyo Kabushiki Kaisha, Tokyo, Japan

[21] Appl. No.: 787,595

[22] Filed: Oct. 15, 1985

[30] Foreign Application Priority Data

Oct. 12, 1984 [JP] Japan ................................ 59-214706

[51] Int. Cl.$^4$ .............................................. F25B 49/00
[52] U.S. Cl. ......................................... 62/127; 236/94
[58] Field of Search ................. 62/125, 126, 127, 129; 236/94; 165/11.1; 371/59; 364/184, 186, 180, 181, 188, 189, 146, 147; 340/365 R; 235/145 R, 146

[56] References Cited

U.S. PATENT DOCUMENTS

| | | | |
|---|---|---|---|
| 4,381,549 | 4/1983 | Stamp, Jr. et al. | 165/11.1 X |
| 4,432,210 | 2/1984 | Saito | 62/126 |
| 4,488,409 | 12/1984 | Hara | 236/94 X |

Primary Examiner—Harry Tanner
Attorney, Agent, or Firm—Armstrong, Nikaido, Marmelstein & Kubovcik

[57] ABSTRACT

In an electrical auxiliary equipment (100; 200) for vehicles, which has a trouble point self-diagnostic function and includes a display unit (10) for indicating the condition of operation of the auxiliary equipment, there is provided a system for driving the display unit (10) to indicate a troubling point when, among a plurality of operation switches (51 to 53, 60 to 65) provided for the equipment, at least two (60, 61) are operated substantially in a concurrent manner.

6 Claims, 8 Drawing Figures

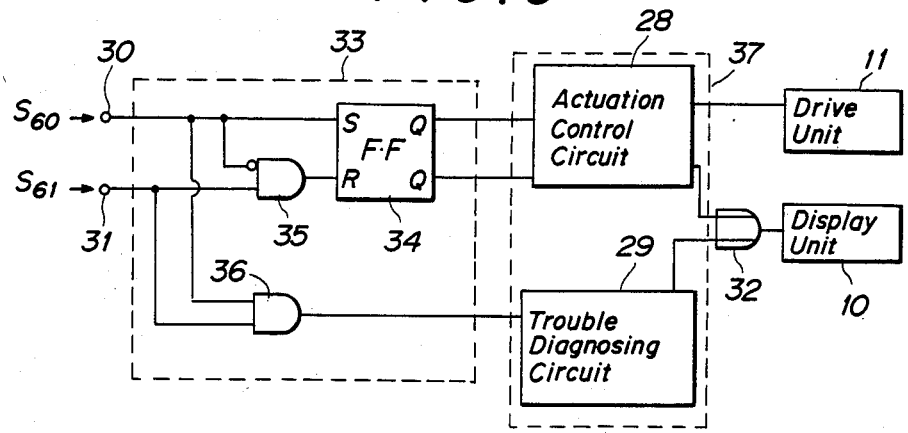
FIG. 6
FIG. 7
| $S_{60}$ | $S_{61}$ | AUTO Operation Command Signal | Stop Command Signal | Trouble Diagnosis Command Signal |
|---|---|---|---|---|
| 0 | 0 | 0 | 0 | 0 |
| 1 | 0 | 1 | 0 | 0 |
| 0 | 1 | 0 | 1 | 0 |
| 1 | 1 | 1 | 0 | 1 |
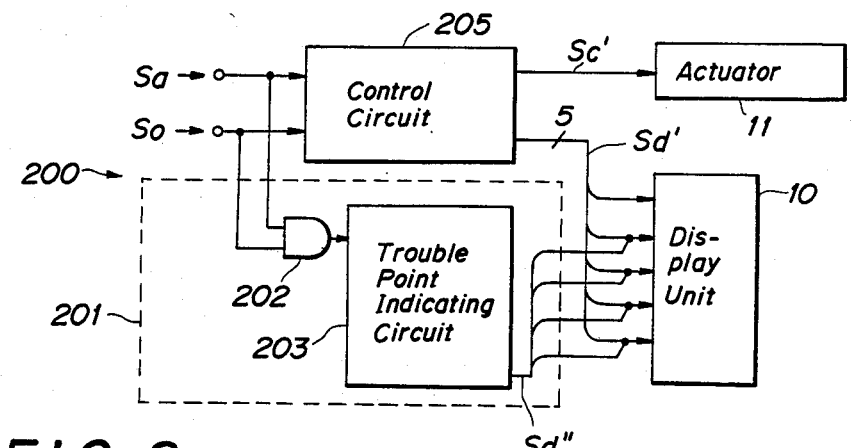
FIG. 8

ELECTRICAL AUXILIARY EQUIPMENT FOR VEHICLES WITH TROUBLE POINT SELF-DIAGNOSTIC FUNCTION

BACKGROUND OF THE INVENTION

1. Field of the Invention

The present invention generally relates to electrical auxiliary equipment for vehicles. More particularly, the invention relates to electrical auxiliary equipment for vehicles of the type which has a trouble point self-diagnostic function.

2. Description of Relevant Art

In general, vehicles have mounted thereon various electrically controlled auxiliary equipment such as an air conditioner. Some of such auxiliary equipment is constituted in a complicated manner with many electrical and mechanical elements, including an operation mode indicator therefor, and require accuracy in operation.

In order that complex auxiliary equipment operates normally, various measures are provided for detecting the early stages of abnormal operation of components.

For example, according to a conventional measure, for auxiliary equipment mounted on a vehicle, an exclusive external apparatus, such as a tester separated from the equipment, is provided to be connected thereto in order to diagnose any trouble with the equipment. Moreover, in another conventional measure, auxiliary equipment for vehicles has a self-diagnostic function internally.

In the former measure, the diagnosis of an equipment problem requires disassembly as well as reassembly of the entirety thereof or at least checks of respective components thereof. Thus, professional skills are needed so that it is considerably hard for a driver of a vehicle to diagnose equipment problems. In this respect, the latter measure is better for maintenance purposes.

For vehicle-mounted auxiliary equipment with self-diagnostic functions, it is generally necessary to install on the rear face of a control unit of such equipment an exclusive switch which operates a self-diagnostic function, or to provide a select coupler in a place away from such a control unit.

The disposition of an exclusive switch or select coupler is inherently made at a place with limited access while the panel front of the control unit is operational, to avoid erroneous operations which otherwise might have accompanied the on-panel operation. If an exclusive switch or select coupler were installed on the panel front, careless operation of the switch by a driver may occasionally turn the auxiliary equipment from an operation mode to a trouble-diagnostic mode, thus confusing the driver.

In auxiliary equipment with such a switch or coupler, however, during problem diagnosis, the control unit has to be removed from the fixing point thereof, so that it takes a certain length of time. In addition, the provision of such a switch or coupler requires extra cost.

The present invention effectively solves such problems of control units of conventional electrical auxiliary equipment for vehicles of the type described.

SUMMARY OF THE INVENTION

According to the present invention, electrical auxiliary equipment for vehicles having a trouble point self-diagnostic function, comprises a load to be actuated, and an operation means for setting the condition of operation of the auxiliary equipment. The operation means includes at least two operation switch means for setting operation conditions. A plurality of detection means is provided for detecting predetermined environmental factors including the working condition of the load. A display means is provided for displaying the operational condition of the equipment. A signal processing means takes into account a set of output signals from the detection means and feeds the load with a control signal in accordance with the operational condition determined on the basis of a set of operation signals from the operation means with a control signal, and feeds the display means with a drive signal for displaying the operational condition as thus determined. In addition, the signal processing means estimates, on the basis of the output signals from the detection means, a point of a trouble state from among the load and the plural detection means. An indication system determines if the at least two operation switch means are concurrently operated. When the operation switch means are concurrently operated, the indication system drives the display means into indicating the point of the trouble state among the load and the detection means, based on the results of the trouble point estimation by the signal process means.

Accordingly, one object of the present invention is to provide electrical auxiliary equipment for vehicles, which indicates a trouble point substantially by utilizing a set of components parts of existing auxiliary equipment, while possibly, eliminating erroneous operations. In addition, even when the equipment is turned to a trouble point indication mode, the indication of a trouble point is kept from being given when no trouble is present, thus avoiding unnecessary confusion by the user. Also, problem diagnoses can be executed for individual parts of the equipment within a predetermined extent and displayed concurrently.

The above and further features, objects and advantages of the present invention will more fully appear from the following detailed description of a preferred embodiment of the invention when read in conjunction with the accompanying drawings.

BRIEF DESCRIPTION OF THE DRAWINGS

In the drawings:

FIG. 6 is a schematic block diagram of an electric circuit of an essential part of an automatic air-conditioner for electrical auxiliary equipment for vehicles according to a first modification of the embodiment of the present invention;

FIG. 7 is a truth table describing relations among essential signals in the electric circuit of FIG. 6; and FIG. 8 is a schematic block diagram of an electric circuit of an essential part of an automatic air-conditioner for electrical auxiliary equipment for vehicles according to a second modification of the embodiment of the present invention.

DETAILED DESCRIPTION OF THE PREFERRED EMBODIMENT

Figure 1:
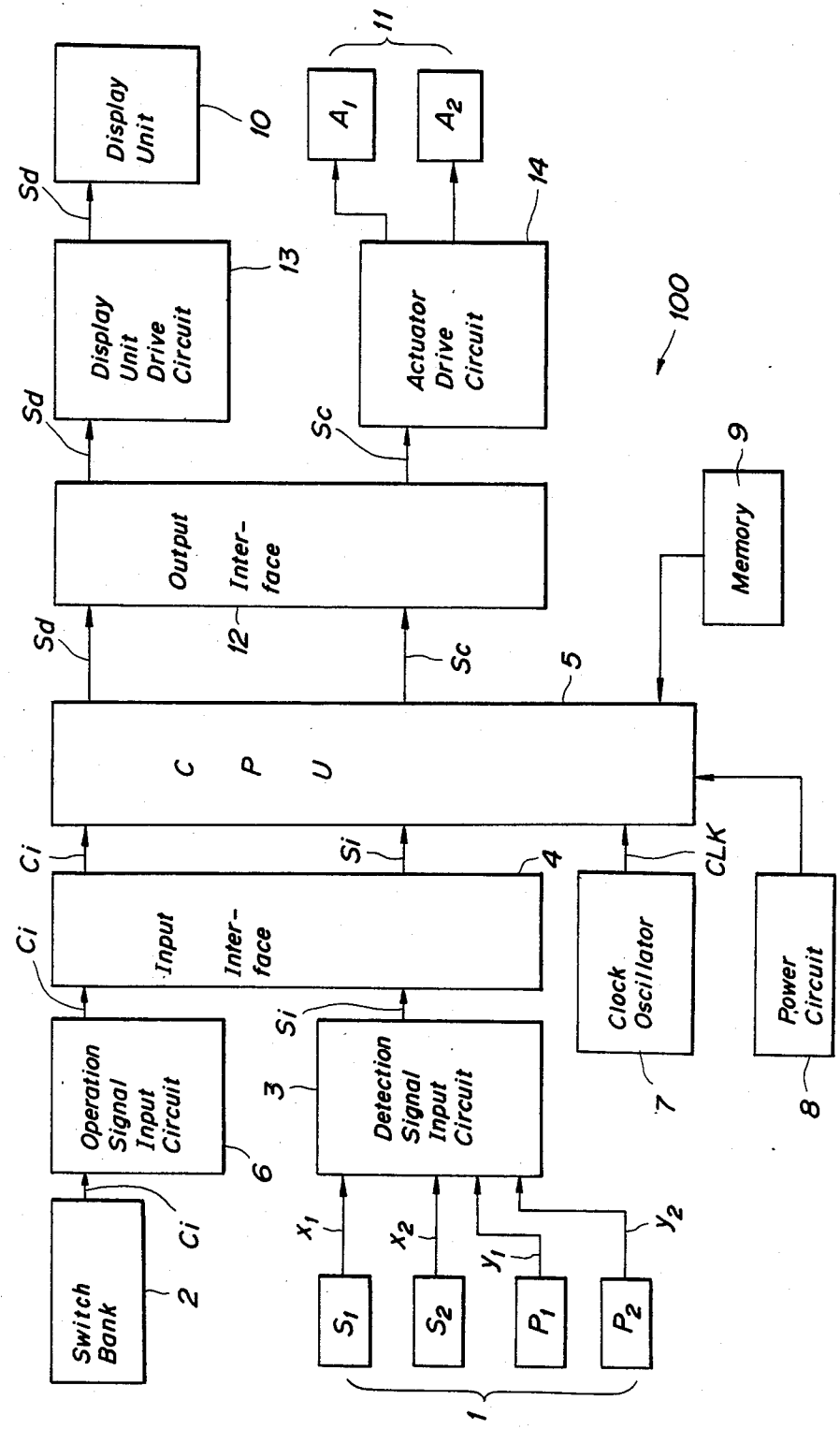
FIG. 1 is a schematic block diagram of circuitry of an automatic air-conditioner for electrical auxiliary equipment for vehicles according to a preferred embodiment of the present invention.

Referring first to FIG. 1, designated at reference number 100 is the entirety of an automatic air-conditioner for electrical auxiliary equipment for vehicles according to a preferred embodiment of the present invention. The air-conditioner 100 has a group 1 of sensors, including an exterior air temperature sensor S1, an interior air temperature sensor S2, and a pair of potentiometers P1, P2 for detecting respective positions of associated dampers (not shown), and a bank 2 of various operation switches mounted on the front of a later-described operation panel which is installed as a part of an instrument panel in the front part of a passenger compartment of a vehicle (not shown) or in a place of easy access for a driver of the vehicle.

Outputs from the sensor group 1 are a set of detection signals, including detection signals X1, X2 and Y1, Y2 output from the temperature sensors S1, S2 and the potentiometers P1, P2, respectively. The signals are conducted to a detection signal input circuit 3 and output therefrom as a set of sensor signals Si through an input interface 4 into a central processing unit 5 (hereinafter called "CPU"). On the other hand, a set of operation signal Ci are output from the switch bank 2 and conducted to an operation signal input circuit 6. The signals Ci are passed thereby to be input through the input interface 4 into the CPU 5. The CPU 5 is provided with a clock oscillator 7 for generating a clock signal CLK to be fed thereto, a power circuit 8 for supplying electric power therefor, and a memory 9 consisting of necessary devices such as ROM and RAM for accessibly storing various data as well as a later-described program.

The air conditioner 100 further has a display unit 10 originally for indicating a condition of operation in one of a plurality of operation modes as described later. An actuation system 11 consists of a pair of actuators A1, A2 for actuating the aforementioned dampers, which are an air-mix damper and a blow-mode select damper in this embodiment.

Furthermore, in the air conditioner 100, the CPU 5 is interfaced through an output interface 12 with a display unit drive circuit 13 and an actuator drive circuit 14. Through circuits 13, 14, a display signal Sd and a control signal Sc, both sent from the CPU 5, are fed to the display unit 10 and the actuation system 11, which are thereby driven in accordance with predetermined conditions.

The display unit 10 has a plurality of later-described indicators corresponding to the operation modes of the air conditioner 100. Moreover, though not shown in the drawings, the air conditioner 100 also includes other ordinary mechanical elements such as an air compressor, a water cock, and a tube.

By repeated improper operation or after a long service period without maintenance, the air conditioner 100 may develop problems such as air not being blown out from the desired air outlets, or such as the air that is blown out not being at the desired temperature. A list of probable causes of these problems can be enumerated as follows:

(i) malfunction of any element of the sensor group 1, due to disconnection of a wire, a short circuit, or the like;

(ii) malfunction of the air-mix damper as an air heating rate controller driven by the actuator A1, such as due to locking of the damper for example;

(iii) malfunction of the blow-mode select damper as an air distribution controller driven by the actuator A2, such as due to locking of the damper for example;

(iv) malfunction of the air compressor, such as a shutdown or break-down thereof;

(v) malfunction of the water cock or tube, due to a blockage or breakage; and (vi) malfunction of the CPU 5 itself or associated devices.

Among the foregoing causes (i) to (vi), malfunctions (iv) and (v) can be relatively easily detected as the location of trouble by the driver on hearing or seeing the problem.

When no malfunction is detected, there may well be present any, some or all of the remaining causes (i) to (iii) and (vi) independently or in combination.

In this respect, the air conditioner 100 employs an indication system for driving the display unit 10, when any, some or all of the causes (i) to (iii) is/are present, into indicating a trouble point or points thereof. Thus, when the air conditioner 100 is malfunctioning or having problems without indicating or detecting any of the causes (i) to (v), the driver may well doubt the CPU is malfunctioning, i.e., cause (vi).

As described, in order for the automatic air-conditioner 100 to perform various functions, the detection signals from the sensor group 1 are all input to the CPU 5. The signals are utilized to estimate various environmental conditions as factors of the air conditioner 100 to thereby effectively control the actuation system 11 in accordance with the operation mode selected by the switch bank 2.

However, to eliminate redundancy and make the explanation comprehensible, in this embodiment as described hereinafter, the sensor group 1 will only include the temperature sensor S1, S2 and the potentiometers P1, P2.

Accordingly, the sensor group 1 only outputs the detection signals X1, X2 and P1, P2 from the above-described detection elements S1, S2 and P1, P2. These signals X1, X2, Y1, Y2 are all input to and constantly read in by the CPU 5, thus always permitting the CPU 5 to estimate the performance and working state of the elements S1, S2, P1, P2 as well as of the objects of detection thereof. In this respect, as will be detailed later, the CPU 5 has a self-diagnostic function of checking the elements S1, S2, P1, P2, based on the signals X1, X2, Y1, Y2 output from the air temperature detecting sensors S1, S2 and the damper position detecting potentiometers P1, P2, for abnormalities as well as checking the detection objects. The CPU also drives the display unit 10 to indicate the result of the trouble point diagnosis. The display unit 10 can be controllably driven into a trouble point display mode as well as into a display mode of the aforesaid operation modes of the air conditioner 100.

In the foregoing arrangement of the air conditioner 100, when the cause of a problem seems to be residing in the malfunction of any of (i) to (iii) and (vi), if the display unit 10 does not indicate a trouble point or problem area concerning the malfunction of (i) to (iii), it is reasonable to doubt cause (vi), that is, the malfunction of the CPU 5 itself or any of its associated devices.

The trouble point display mode of the automatic air-conditioner 100 with the trouble point self-diagnostic function is now described.

Figure 4:
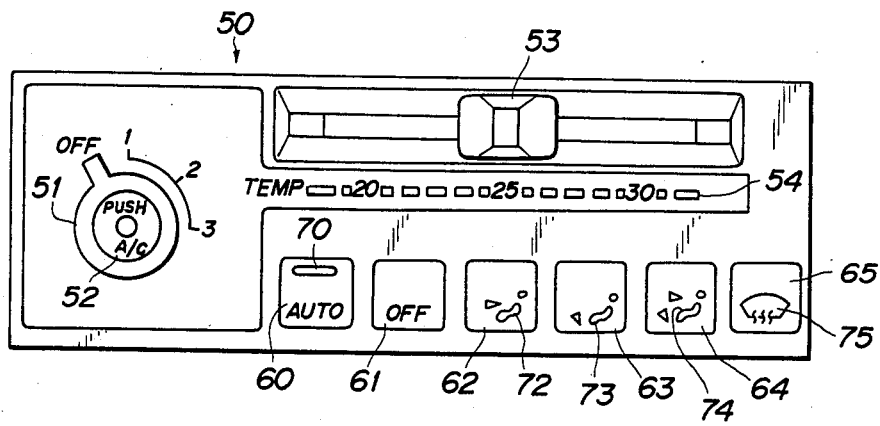
FIG. 4 is a front view of an operation panel of the automatic air conditioner provided with various operation switches and indicators.

Reference is now made to FIG. 4 which is a front view of the aforementioned operation panel of the air conditioner 100. In FIG. 4, designated by reference numeral 50 is the entirety of the operation panel.

The operation panel 50 has an operation switch 51 mounted thereon. The operation switch 51 is a rotary type switch which is rotated for setting the operation of a fan (not shown) in any of the four selectable modes. The selectable modes are "off" and three stages of rotation speed of the fan. At the central part of the rotary operation switch 51, a pushbutton operation switch 52 is provided as a compulsory on-off control of the aforesaid air compressor.

The operation panel 50, which is of a rectangular form, further has a control element 53 manually slidable along the upper longer side of the rectangular operation panel 50. In other words, the control 53 is slidable along a temperature scale 54 divided in the transverse direction of the vehicle. Element 53 is used to set the temperature of the air from the air outlets at a desired level. The control element 53 as well as the rotary and the pushbutton switches 51, 52 are part of the aforementioned switch bank 2. The switch bank 2 further includes, under a temperature setting portion consisting of the element 53 and the scale 54, a plurality of (six, in this embodiment) operation switches 60 to 65 for setting the operational condition of the air conditioner 100 in any of the selectable operation modes and a plurality of (five, in this embodiment) indicators 70 and 72 to 75 for indicating a selected one of the operation modes. This set of six operation elements 60 to 65 is adapted such that the element 60 is an "AUTO" mode operation switch for driving the air conditioner 100 into an automatic mode of operation. Element 61 is an "OFF" mode operation switch for stopping the operation of the air conditioner 100. Element 62 is a ventilation mode operation switch for sending blowing air into an upper zone of the passenger compartment of the vehicle. Element 63 is a heat mode operation switch for sending blowing air into a lower zone of the passenger compartment. Element 64 is a bi-level mode operation switch for sending blowing air into both upper and lower zones of the passenger compartment. Element 65 is a defrost mode operation switch for sending blowing air against or along a front windshield of the vehicle. The set of five indication elements 70 and 72 to 75 constitute the display unit 10 of FIG. 1. Element 70 is an "AUTO" mode indicator for indicating that the air conditioner 100 is in the automatic operation mode. Elements 72 to 75 are various mode indicators for indicating the selection of one of the other operation modes that is specifically associated with a corresponding one of the operation switches 62 to 65.

In the foregoing arrangement, when the operation switch 60 is pushed on, the air conditioner 100 enters the automatic mode as a full-automatic operational condition governed by the CPU. The indicator 70 is illuminated or ON and is kept illuminated thereafter. The other indicators 72 to 75 are all not illuminated, that is, OFF.

Under the full-automatic operation mode, when any of the remaining operation switches 62 to 65 is pushed on, the air conditioner 100 is brought into another operation mode that corresponds to the thusly operated one of the switches 62 to 65. Concurrently, the corresponding one of the indicators 72 to 75 becomes illuminated. Exemplarily, under the condition of a full-automatic mode, when the operation switch 62 is operated, the air conditioner 100 is turned to and fixed in a ventilation mode in which air blows substantially at chest level. Concurrently, the indicator 72 goes on, while the AUTO indicator 70 goes off. Moreover, when the air conditioner 100 is operating in an operation mode corresponding to any of the operation switches 60 and 62 to 65, and the OFF mode operation switch 61 is operated, the air conditioner 100 stops running. Concurrently, any of the indicators 70 and 72 to 75 that has been illuminated until then goes out.

Further, in the foregoing arrangement, the CPU 5 preferentially receives the operation of the AUTO switch 60 over that of the OFF switch 61. In other words, when both the AUTO switch 60 and the OFF switch 61 are operated in a concurrent manner, the operation of the latter 61 is neglected by the CPU 5, while that of the former 60 is accepted. In this respect, when the air conditioner 100 is put in the full-automatic operation mode, if both the switches 60, 61 are depressed in a concurrent manner, the air conditioner 100 enters the trouble point display mode as will be detailed later.

Upon selection by the corresponding operation switch, any of the foregoing various modes of operation of the air conditioner 100 is under the control of the CPU 5 and follows a computer program.

Figure 2:
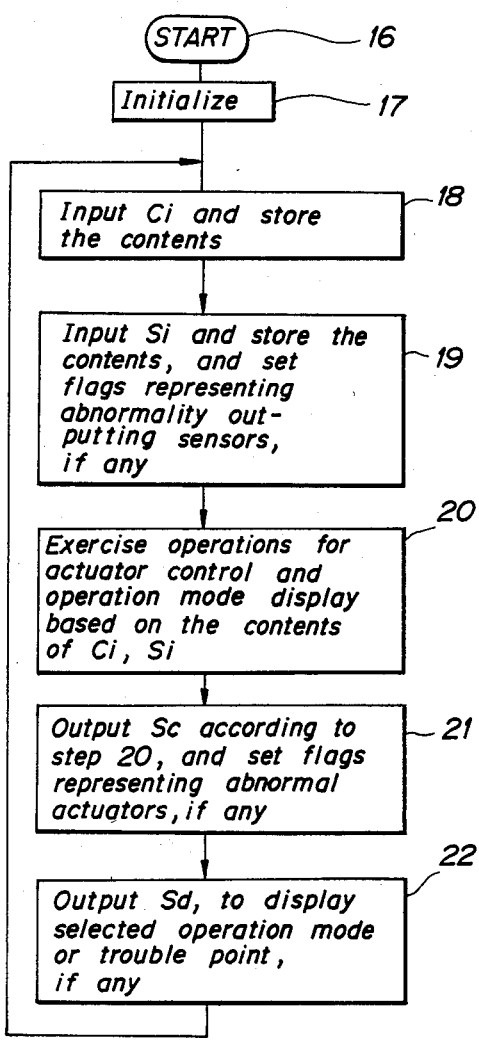
FIGS. 2 and 3 are schematic flow charts of a program to be followed by a central processing circuit in the circuitry of FIG. 1, respectively.

FIG. 2 is a schematic flow chart of the program. As shown therein, at the first step 16 of the program, electric power is applied to provide a reset signal for the CPU 5, thereby starting the execution of the program.

At a subsequent step 17, respective parameters are initialized, so that, for example, respective flags provided for indication of abnormalities, such as of the sensors, are initialized to zero.

At a further subsequent step 18, based on the operation signal $C_i$ from the switch bank 2, the respective operation switches 51 to 53 and 60 to 65 are evaluated for the set state and the on-off state. The switch conditions are encoded into a set of switch data to be stored in the memory 9.

At a subsequent step 19, the sensor signals $S_i$, as output values from the sensor group 1, are all input and encoded into a set of sensor data to be stored in the memory 9. If any abnormal output value is found, one of the abnormality flags, that corresponds to a detection element having output an abnormal value is set.

At a yet subsequent step 20, based on the data stored in the memory 9 in accordance with the sensor signals $S_i$ from the sensor group 1 and the operation signals $C_i$ from the switch bank 2, respective operations are executed. The operations control the actuators A1, A2 of the actuation system 11. In addition, necessary operations are processed for displaying the operation mode as selected.

Then, at a step 21, according to the results of the operations at step 20, the control signal Sc is output to drive the respective actuators A1, A2 of the actuation system 11, as required. Moreover, for any actuator accompanied by an abnormality, a difference is calculated to determine if a predetermined criterion is exceeded. The criteria used in the determination is a control value resulting from the operations at step 20 and a related output value given as one of the sensor signals $S_i$ that is output from the potentiometer P1 or P2. The potentiometers detect the working position of the damper actuated by the actuator. Also used in the determination is any abnormal output value from each of the potentiometers P1, P2 that is different from the normal state. Thus, for the actuator with an abnormality that exceeds the criteria, one of the abnormality flags corresponding to the actuator of concern is set.

At a step 22 subsequent to the step 21, according to the results of the operations of the step 20, the display signal Sd is output to the display unit 10 for displaying the operation mode as selected or, when the aforementioned particular switch operation is made and if any abnormality is found, for indicating the trouble point as flagged at step 19 or 21.

Then, the flow of the program goes to the step 18, thus repeating a routine of steps 18 to 22 in order.

As described, in a normal state of the operation mode of the air conditioner 100, the display unit 10 is utilized as an operation mode display. Also in the normal state, the CPU 5 is diagnosing the sensor group 1 as well as the objects of the sensor group 1 to check for trouble points determined from the sensor signals Si.

In this respect, while the air conditioner 100 is working in any normal operational mode, if any abnormality is detected of any element of the sensor group 1, that is, the temperature sensor S1 or S2 or the potentiometer P1 or P2, or of any detected apparatus, that is, the aforesaid dampers, then the CPU 5 sets one of the abnormality flags that corresponds to this trouble point. Concurrently, a predetermined substitute value is given, resulting from the operations in order to determine the contents of the control signal Sc and the drive signal Sd from that of the data which corresponds to the trouble point. As a result, event while an abnormality is developed at any of the elements or apparatuses, the air conditioner 100 continues to operate by the combination of such compensated data with other normal data of operation, unless the abnormality is critical.

Besides, the function of operational mode control, the CPU 5 performs the function of trouble point diagnosis, while storing any and all detected trouble points in the memory 9 by setting abnormality flags. Thus, trouble points can be indicated on the display unit 10 by simply turning the unit 10 from the display mode of operation mode to that of the trouble point mode.

Figure 3:
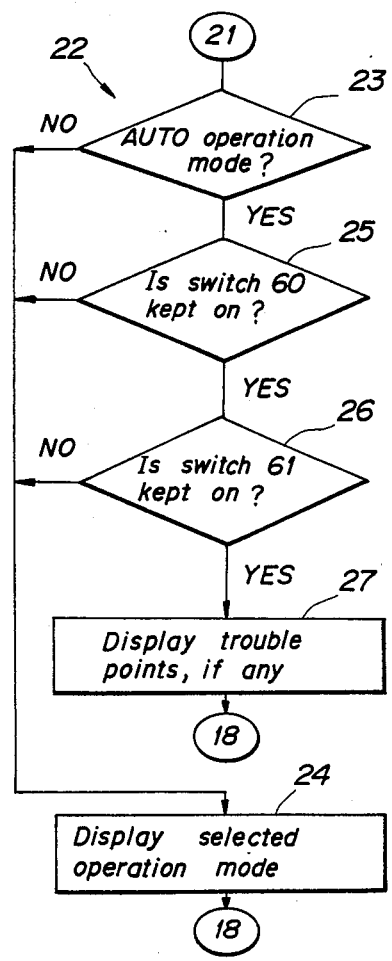

FIG. 3 is a flow chart showing the contents of the aforementioned step 22 of the program, and represents a sequence for a prepared operating procedure for the display mode change of the display unit 10.

First, the operating procedure will be described when the AUTO mode and OFF mode operation switches 60, 61 are operated to change the mode of the display unit 10 from the operation mode display mode to the trouble point display mode. Then, the process sequence of the program along the flow chart of FIG. 3 will be described.

When the display unit 10 is turned to the trouble point display mode, first, the AUTO switch 60 is pushed to bring the air conditioner 100 into the full-automatic mode. Then both the AUTO and OFF switches 60, 61 are depressed concurrently for a desired length of time. Thus, the CPU 5 puts the trouble point display mode in effect and reads the state of respectively abnormality flags one by one, while the automatic mode of the air conditioner 100 is maintained operative. During the time in which both the AUTO and OFF switches 60, 61 are thus depressed, if any of the flags are set which correspond to a problem at the temperature sensors S1, S2 and the potentiometer P1, P2 for the dampers A1, A2, respectively, then one of the corresponding indicators 72 to 75, which are each respectively associated with one of the problems becomes illuminated, thereby indicating the trouble point or problem area. In case none of the abnormality flags corresponding to the detection elements of the sensor group 1 is set, then none of the indicators 72 to 75 becomes illuminated.

In the flow chart of FIG. 3, at a first step 23, a determination is made as to whether or not the air conditioner 100 is in the full-automatic mode, since the transition into this mode is a prerequisite for entering the trouble point display mode. If not in the full-automatic mode, the program goes to step 24 to keep the current operation mode display mode in effect, so that the display unit 10 indicates the prevailing operation mode of the air conditioner 100. If the air conditioner 100 is in the full-automatic mode, then the program goes to step 25 where an additional determination is made as to whether or not the AUTO switch 60 is depressed. If AUTO switch 60 is not depressed at step 25, the program goes to the aforesaid step 24. If AUTO switch 60 is depressed, the program goes to another step 26, where under the condition that the air conditioner 100 is in the full-automatic mode and the AUTO switch 60 is depressed, a further determination is made as to whether or not the OFF switch 61 is also depressed. As already described, though originally being oriented for a shutdown purpose, the OFF mode operation switch 61, when depressed concurrently with the AUTO mode operation switch 60 in the full-automatic mode of the air conditioner 100, leaves the air conditioner 100 as it is in the full-automatic mode. If switch 61 is not depressed at step 26, the program goes to step 24. In addition, if switch 61 is depressed, the program goes to still another step 27 in which, as the respective requirements for transition into the trouble point display mode have been determined to be satisfied at the steps 23, 25, 26, an interrogation is made to the memory 9 for an abnormality flag or flags set in the aforementioned step 19. After reading the flag or flags, an indication is made of the corresponding trouble point or points by utilizing the display unit 10.

In the trouble point display mode, the display unit 10 becomes illuminated at the indicator 72 when the exterior air temperature sensor S1 is determined to be abnormal. The indicator 73 illuminates for an abnormality of the interior air temperature S2. The indicator 74 illuminates for an abnormality of the actuator A1 of the temperature controlling air-mix damper. The indicator 75 illuminates for an abnormality of the blow-mode select damper. Therefore, by such illumination, effective facilitation is achieved to visually grasp the trouble point or points as described.

Figure 5:
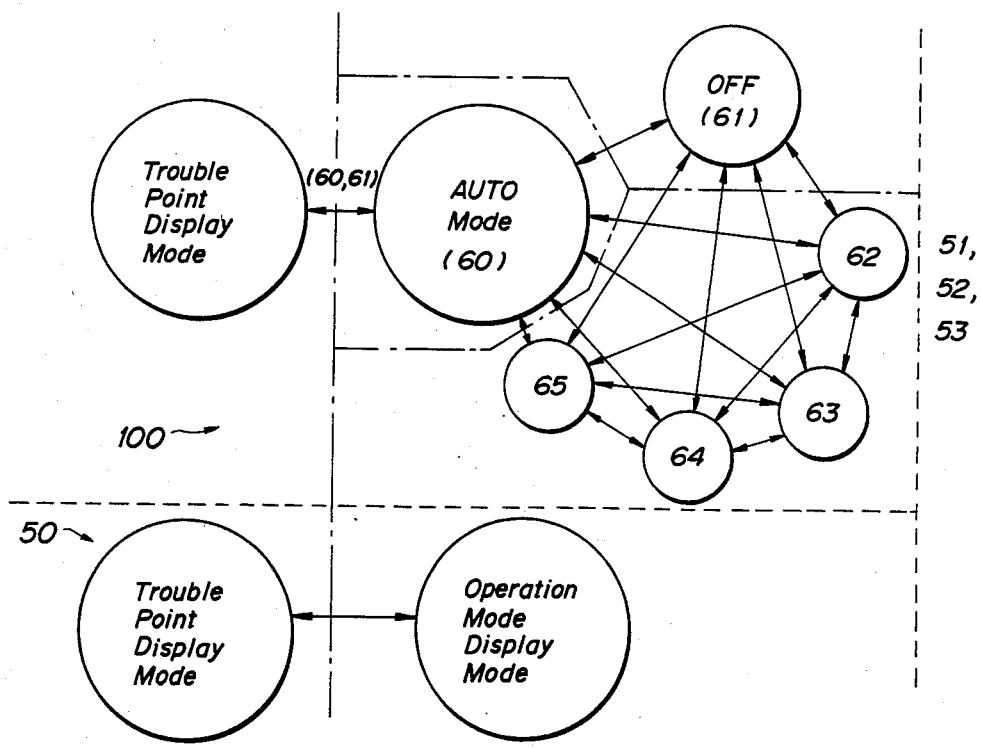
FIG. 5 is a flow chart describing the relation of transitions among various operation modes of the automatic air conditioner.

Reference is now made to FIG. 5 as a chart illustrating the transition among various operation modes of the automatic air conditioner 100.

As understood from the foregoing description, the air conditioner 100 has six different modes of operation selectable thereamong by exclusively pushing one of the operation switches 60 to 65. For easier comprehension, in the flow chart of FIG. 5, four of six nodes corresponding to the six operation modes are simply designated by the same reference numerals as the operation switches 62 to 65 that correspond to four of the six modes.

While the air conditioner 100 is operating in any of the six operation modes, the operation panel 50 which functions as the display unit 10, is put in the operation mode display mode.

When the air conditioner 100 is put in an AUTO operation mode, that is, in the full-automatic mode with the AUTO switch 60 set on, with both the AUTO mode and OFF mode operation switches 60, 61 concurrently depressed, the air conditioner 100 transitions through a part of the control mode including the display unit drive circuit 13, to a trouble point display mode. Even though a transition of the display mode, from the operation mode display mode to the trouble point display mode at the display unit 10 takes place, the air conditioner 100 as a whole is left as it is in the full-automatic mode.

When the AUTO and OFF switches 60, 61 are released from the concurrent depression, the air conditioner 100 has a reverse transition of the control mode to return to the AUTO operation mode. Similarily, a reverse transition of the display mode from the trouble point display mode to the operation mode display mode at the display unit 10 takes place.

In the foregoing embodiment, the air conditioner 100 can be set in the trouble point display mode, if exemplarily the detection signal Y1 output from the potentiometer P1 is abnormal, which indicates a trouble point.

In addition, when the mode of the automatic air conditioner 100 is changed into the trouble point display mode, the mode change is effected by the existing operation switches that are originally provided in the air conditioner and, the display of the trouble point is made using existing indicators. Accordingly, a trouble point self-diagnostic function is facilitated by the trouble point display, without the need of providing extra switches or indicators and thus self-diagnosis is achieved at a low cost.

Furthermore, according to the embodiment, even when the described switch operation is made to change the AUTO mode to the trouble point display mode, if no problems are detected from the temperature sensors S1, S2 and the damper actuators A1, A2 and hence none of the abnormality flags are set, the air conditioner 100 is left as it is in the AUTO mode, without giving any particular indication of trouble. Thus, unnecessary confusion by the user is avoided which otherwise might have been experienced.

In the foregoing embodiment, the present invention is applied to an automatic air conditioner. However, it will be apparent that the present invention may preferably be applied to a voluntary auxiliary equipment for vehicles that has adequate component parts for such an application.

As understood from the foregoing description, according to the present invention, in electrical auxiliary equipment, such as an automatic air conditioner for vehicles with a trouble point self-diagnostic function, an indication system is provides which permits an ordinary operation mode display unit to be utilized for trouble point indication. In addition, a plurality of ordinary operation switches are used for the mode change into a trouble point display mode, thus effectively saving the cost which otherwise might have been needed for the provision of an exclusive separate apparatus.

Moreover, the indication system can be brought into the trouble point display mode by way of a distinct operation different from ordinarily employed operating methods. Thus, the possibility of the trouble point display mode appearing by mistake in ordinary operation of the equipment is effectively eliminated.

Further, in the trouble point display mode, the indication of a trouble point is given only when any of detection elements or detection objects is malfunctioning. Hence, a trouble indication will not be made if none of the elements is out of order, thus avoiding the confusion of the user, as described.

In addition, when a plurality of trouble points are indicated, all associates indicators can be illuminated in a concurrent manner, thus permitting the entire equipment to be diagnosed at a glance as to the state of trouble.

Although, in the foregoing embodiment, it is supposed hitherto that the temperature sensors as well as the potentiometers are provided in pairs as objects of diagnosis of the CPU 5, the present invention may be embodied as a voluntary auxiliary equipment for vehicles in which there are more detection elements than embodied above, as a matter of course.

In this respect, the point of the present invention resides in that, in electrical auxiliary equipment for vehicles having a trouble point self-diagnostic function and including a display unit for displaying the condition of operation of the equipment, the display unit as well as associated parts of the equipment is brought into a trouble point display mode by concurrently depressing, among a plurality of ordinary operation switches inherently provided for the equipment, at least two which may preferably be contradictory to each other in the proper function.

Accordingly, although, in the foregoing embodiment, the mode transition into the trouble point display mode is permitted only when both the AUTO and the OFF mode operation switches are depressed in a concurrent manner when the air conditioner 100 is set in the full-automatic mode, the number of operation switches to be concurrently operated is not limited to two. Further, it is not always necessary to indicate a trouble point under the condition that an automatic mode is prevailing.

For example, when the present invention is applied to an automatic air conditioner as auxiliary equipment for vehicles including, at least, ten keys with digits of zero to nine and a plurality of well-known numeric display LED's each respectively provided with eight indication segments, the numeric display LED's as well as the air conditioner may be brought into a trouble point display mode providing concurrent operations of three keys have digits of 1, 4, and 7.

In the foregoing embodiment, the air conditioner 100 can be brought into the trouble point display mode, by simply adding the steps 23, 25, 26, 27 to the originally provided program of the CPU 5 and hence without substantial increase in the number of individual constituent parts of the entire equipment.

In this respect, however, where such a program itself is undesirable or substantially incapable of additional process steps, the present invention may be embodied by slight addition of hardware.

For example, in some of the commercially available automatic air conditions, there is employed a custom-made masked IC integrally provided with an input circuit, an input interface, a clock, a CPU, an output interface, a drive circuit, and a ROM as part of a display unit. For users of such a masked IC, it is almost impossible to change a program written in a ROM of the IC, since in most cases the ROM of such a masked IC is substantially fully utilized.

In such cases, the foregoing embodiment of the present invention may be partially modified in such a form as illustrated in FIG. 6 or 8.

FIG. 6 shows a schematic diagram of an electric circuit according to a first modification of the above embodiment. The electric circuit is for electrically effecting the change-over from the operation mode display mode to the trouble point display mode in the automatic air conditioner 100. This modification employs a control means 37 with an actuation control circuit 28 for controlling the actuation of respective apparatuses for providing various normal services of the air conditioner 100. The control means also has a trouble diagnosing circuit 29 for diagnosing various detection elements as well as the apparatuses for trouble points. The control means 37 is provided at the input side with an input circuit 33 having a pair of input terminals 30, 31. Input terminal 30 is for receiving an operation signal S60 from the AUTO mode operation switch 60. Input terminal 31 is for receiving an operation signal S61 from the OFF mode operation switch 61. Control means 37 is provided additionally at the output side with a drive unit 11 as part of the actuation system to receive an AUTO operation command signal from the actuation control circuit 28. Control means 37 is provided further at the output side with the display unit 10 receiving through an OR gate 32 a pair of later-described command signals from the actuation control circuit 28 and the trouble diagnosing circuit 29. The input circuit 33 comprises an R-S flip-flop 33 (hereinafter simply called "F.F") as a bistable multi-vibrator with set and reset input terminals S, R and bistable output terminals Q, $\overline{Q}$, an AND gate 36, and a gate 35 as shown in FIG. 6.

In the foregoing arrangement, when the operation signal S60 is turned to a "high" level by operating the AUTO switch 60, the operation signal S61 is left at a "low" level. Then, the F.F 35 is set through the gate 35 while the trouble diagnosing circuit 29 is made inoperative by the gate 36, so that with the output terminal Q of the F.F 34 at a "high" level, the actuation control circuit 28 is put in an operative state for automatic operation.

With the AUTO switch 60 operated and S60 "high", when the OFF switch 61 is operated, the operation signal S61 is turned to a "high" level, rendering the trouble diagnosing circuit 29 operative through the gate 36. Accordingly, the AND gate 36 serves as a checking means for the trouble diagnostic mode. In this respect, when the operation signal S61 is turned to a "high" level, the operation signal S60 is left at a "low" level, the F.F 34 is reset through the gate 35, thus rendering the actuation control circuit 28 inoperative.

According to this modification, the air conditioner 100 is permitted, through the input circuit 33, to be driven, in accordance with combinations of operation of the AUTO and OFF switches 60, 61, into the indication of trouble points by the display unit 10, as well as automatic operations by the actuation control circuit 28 and trouble diagnoses by the trouble diagnosing circuit 29.

FIG. 7 is a truth table representing relations between the combination of the operation signals S60, S61 and the aforesaid command signals which are responsible for operative and inoperative states of the actuation control circuit 28 and the trouble diagnosing circuit 29.

FIG. 8 is a schematic circuit diagram of an essential part of an automatic air conditioner as electrical auxiliary equipment for vehicles according to a second modified example of the present invention. With respect to the embodiment described and this modified example, like reference numerals designate like parts.

In FIG. 8, designated by reference numeral 200 is the entirety of the air conditioner. The air conditioner 200 includes a control circuit 205 corresponding to a set of the whole circuit elements of the circuitry of FIG. 1, except for the display unit 10 and the actuation system 11. The actuation system 11 of FIG. 1 is substituted by a single representative actuator 11 in FIG. 8. The control circuit 205 feeds a display system 10 with a display drive signal Sd'. and the actuator 11 with a control signal Sc'.

The hardware of the air conditioner 200 is analogous to that of the air conditioner 100, including an unshown operation panel, except for an additive circuit 201 to be described below. Moreover, the conditions of the transition between various operation modes of the air conditioner 200 are substantially the same as those of the air conditioner 100, except for transitions to and from a trouble point display mode of the air conditioner 200.

The additive circuit 201 comprises an AND gate 202 with a pair of input terminals connected to lines of operation signals Sa, So from AUTO mode and OFF mode operation switches (not shown). The AUTO and OFF mode operation switches are analogous to the switches 60, 61 of the aforementioned embodiment, respectively. The input of a trouble point indicating circuit 203 is connected to an output terminal of the AND gate 202. The output of the circuit 203 is through four output lines to four indicators of the display unit 10. The indicators are analogous to the indicators 72 to 75 of the aforementioned embodiment, respectively. The trouble indicating circuit 203 accesses a commonly used RAM of the control circuit 205 in order to read various data stored therein.

In the air conditioner 200, when both the AUTO and OFF switches are depressed in a concurrent manner, the operation signals Sa, So are both turned to a "high" level or become "1". In such a state, the control circuit 205 receives only the operation signal Sa from the AUTO switch, to thereby bring the conditioner 200 into an automatic operation mode, so that an indicator corresponding to the indicator 70 is illuminated. Similarily, when the air conditioner 200 is changed into the trouble display mode, the AND gate 202 has an output level of "1", thereby causing the trouble point indicating circuit 203 to output a trouble point indication signal Sd" to the display unit 10. The content of this signal Sd" depends on the state of abnormality flags and, hence, if none of the flags are set, none of the indicators are illuminated.

Under such a condition, if the AUTO and OFF switches are released from the concurrent depression, the air conditioner 200 returns to a normal automatic operation mode.

As understood from the foregoing description, according to this modified example somewhat different from the aforementioned embodiment, even while being in any operation mode, the air conditioner 200 enters the trouble point display mode by concurrent depression of the AUTO and the OFF switches and returns to the automatic operation mode by releasing the switches.

Although there has been described what is at present considered to be the preferred embodiment of the invention, it is understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. An electrical auxiliary equipment for vehicles having a trouble point self-diagnostic function, comprising:
   a load to be actuated;
   operation means for setting non-diagnostic conditions of operation of said auxiliary equipment and for outputting a set of operational signals, said operation means including at least two operation switch means for setting normal non-diagnostic operational conditions;
   a plurality of detection means for detecting predetermined environmental factors including the operation condition of said load and for outputting a set of output signals based on said detected factors;
   display means for displaying the operation condition of said auxiliary equipment;
   signal processing means for receiving said set of output signals from said detection means, for receiving said set of operational signals from said operation means, for outputting a control signal to said load, for outputting a drive signal to said display means, said control signal and said drive signal being determined on the basis of said set of operational signals from said operation means, said display means being driven by said drive signal to display the operational condition determined from said operation signals, and said signal processing means for estimating a point of a trouble state among said load and said plurality of detection means based on said output signals from said detection means; and
   indication system to drive said display means into indicating said point of said trouble state among said load and said detection means, the indication of said display means being based on the results of a trouble point estimation by said signal processing means, said display means being driven by said indication system when said at least two operation switch means are concurrently operated.

2. An electrical auxiliary equipment (100) according to claim 1, wherein:
   said at least two operation switch means (60, 61) comprise a combination of first operation switch means (60) and second operation switch means (61);
   said signal process means (3 to 7, 9, 12 to 14) preferentially receives one (Sa) of said operation signals (Ci) output from said first operation switch means (60), over another (So) of said operation signals (Ci) that is output from said second operation switch means (61); and
   said indication system (22) drives said display means (10) into indicating said point in said trouble state, when the determination of simultaneous operation of said first and said second operation switch means (60, 61) is made, while said auxiliary equipment (100) is operating in one of said operational conditions that is set in advance by said first operation switch means (60).

3. An electrical auxiliary equipment according to claim 2, wherein said display means is driven by said indication system while neither said load or said detection means is in a trouble state, said display means displays one of said operational conditions set by said first operation switch means.

4. An electrical auxiliary equipment (100) according to claim 1, wherein:
   said signal processing means (3 to 7, 9, 12 to 14) including
   a central processing unit (5) to receive said output signals (Si) from said detection means (S1, S2, P1, P2) and said operation signals (Ci) from said operation means (51 to 53, 60 to 65), and to output said control signal (Sc) for the actuation of said load (A1, A2) and said drive signal (Sd) for driving said display means (10); and
   a memory (9) for holding a program (16 to 27) for said central processing unit (5); and
   said indication system (22) includes a partial set of instruction steps (23 to 27) of said program (16 to 27).

5. An electrical auxiliary equipment (200) according to claim 7, wherein
   said indication system (201) includes
   judging circuit means (202) to receive respective ones (Sa, So) of said operation signals (Ci) that are output from said at least two operation switch means (60, 61), and to determine whether said respective ones (Sa, So) of said operation signals (Ci) are all in actuating states thereof; and
   trouble point indicating circuit means (203) to feed said display means (10) with a trouble point indication signal (Sd") for the driving thereof into indicating the operation conditions that represents said point of said trouble state among said load (A1, A2) and said detection means (S1, S2, P1, P2), said trouble point indication signal being feed following the results of the diagnosis by said signal process means (205) when said respective ones (Sa, So) of said operation signals (Ci) are determined to be all in said actuating states.

6. An electrical auxiliary equipment (100; 200) according to claim 1, wherein:
   said at least two operation switch means (60, 61) of said operation means (51 to 53, 60 to 65) are each respectively for setting either of two mutually contradictory operational conditions.

* * * * *